UNITED STATES PATENT OFFICE.

ALFRED W. SPERRY, OF HARTFORD, CONNECTICUT, ASSIGNOR OF THREE-TENTHS TO G. WELLS ROOT, OF SAME PLACE.

COMPOSITION OF MATTER AS A SUBSTITUTE FOR HARD RUBBER, &c.

SPECIFICATION forming part of Letters Patent No. 358,082, dated February 22, 1887.

Application filed May 14, 1886. Serial No. 202,152. (No specimens.)

*To all whom it may concern:*

Be it known that I, ALFRED W. SPERRY, of Hartford, in the county of Hartford and State of Connecticut, have invented a certain new and useful Improvement in a Composition of Matter as a Substitute for Hard Rubber and the Like, of which the following is a full, clear, and exact description, whereby any one skilled in the art can make and use the same.

The object of my invention is to provide a cheap material that will be equal to hard rubber in color, density, durability, and applicable to as many uses in commerce and the arts as is rubber, and shall possess at the same time the desired qualities of the material known as "hard rubber" in the highest degree, while the new composition of matter is cheaper as a crude material and more easily molded, cut, or formed to its shape.

To this end my invention consists of a body, a starch mixture, and a binder mixture, composed of the materials and in the proportions substantially as hereinafter described.

I. *Starch mixture.*—To prepare this, I use three ounces of starch dissolved in one-half pint of cold water, to which is added two pennyweights of tannin, thoroughly stirred and mixed together. This is heated in a water bath until it steams, when three ounces of alum is added and the heat continued. I next dissolve five pennyweights of extract of logwood in water heated to a boiling-point and add this to the above mixture, heating the whole and stirring constantly until it thickens. One-half pint of hot water is then added to this and it is ready for use as the starch mixture.

II. Two ounces of ground glue is dissolved in its own weight of milk in a water bath, where it must cook at least twelve hours.

III. *Binder mixture.*—I take four ounces of resin which has been boiled and dissolved in caustic soda, and the soda afterward removed as far as possible by repeated washings with warm water, and add to it the above glue mixture and three ounces of shellac dissolved in alcohol, in the proportion of four pounds of shellac to one gallon of alcohol, and to this is next added one pennyweight of paraffine, the whole being cooked in a water bath until thoroughly mixed and combined. This I call the "binder mixture," and as such it is ready for use.

IV. The body, which is composed of one pound of sifted ivory sawdust, is prepared in any convenient manner.

To make the composition, I heat the starch mixture and mix it thoroughly with the body, then add the binder mixture, which should be heated, and work and knead them all thoroughly together, then evaporate all moisture by heat, and when dried grind or pulverize the composition to as fine a powder as possible. After this the dry powder is pressed to final shape by placing it in molds or dies and subjecting it to heat and pressure. These dies may form the material to final shape, as of knobs, blocks for insulating purposes, handles for brushes, &c., or may be made into blocks which are cut and worked by tools in substantially the same manner as hard rubber.

Instead of the logwood, a color other than black may be produced by mixing with the starch mixture the desired coloring material.

I claim as my improvement—

A composition of matter composed of ivory-dust or the like material, making up substantially fifty per cent. of the compound, a starch mixture, consisting of starch, tannin, and an alkali, as alum, a binder mixture, consisting of a resinous gum dissolved in alkali, as caustic soda, and milk, glue, shellac, and alcohol, the whole combined and intimately mixed, all substantially as described, and for the purpose set forth.

ALFRED W. SPERRY.

Witnesses:
H. R. WILLIAMS,
CHAS. L. BURDETT.